(12) United States Patent
Wu

(10) Patent No.: US 11,910,431 B2
(45) Date of Patent: Feb. 20, 2024

(54) TRANSMISSION METHOD AND RELATED DEVICES

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 411 days.

(21) Appl. No.: 17/205,817

(22) Filed: Mar. 18, 2021

(65) Prior Publication Data

US 2021/0212085 A1 Jul. 8, 2021

Related U.S. Application Data

(63) Continuation of application No. PCT/CN2019/103015, filed on Aug. 28, 2019.

(30) Foreign Application Priority Data

Sep. 19, 2018 (CN) .......................... 201811095578.4

(51) Int. Cl.
*H04W 72/566* (2023.01)
*H04L 1/1812* (2023.01)
(Continued)

(52) U.S. Cl.
CPC ......... *H04W 72/569* (2023.01); *H04L 1/1812* (2013.01); *H04L 5/0048* (2013.01);
(Continued)

(58) Field of Classification Search
None
See application file for complete search history.

(56) References Cited

U.S. PATENT DOCUMENTS

2012/0140708 A1\* 6/2012 Choudhury ........... H04L 1/0027
370/328
2013/0215811 A1 8/2013 Takaoka et al.
(Continued)

FOREIGN PATENT DOCUMENTS

CN 101742651 A 6/2010
CN 102665284 A 9/2012
(Continued)

OTHER PUBLICATIONS

Extended European Search Report dated Oct. 22, 2021 as received in application No. 19862849.7.
(Continued)

*Primary Examiner* — Ajit Patel
*Assistant Examiner* — Liem H. Nguyen
(74) *Attorney, Agent, or Firm* — Maschoff Brennan

(57) ABSTRACT

The present disclosure provides a transmission method and a related device. Said method comprises: when it is determined that N uplink channels to be sent cannot be sent simultaneously, sending at least part of the N uplink channels according to priority corresponding to each uplink channel among the N uplink channels, N being an integer greater than 1, the priorities corresponding to the uplink channels being determined on the basis of priority determination parameters corresponding to the uplink channels, and the priority determination parameters at least including service information corresponding to the uplink channels.

20 Claims, 5 Drawing Sheets

(51) Int. Cl.
  *H04L 5/00*      (2006.01)
  *H04W 52/14*     (2009.01)
  *H04W 72/1268*   (2023.01)
  *H04W 74/08*     (2009.01)
  *H04W 76/27*     (2018.01)

(52) U.S. Cl.
  CPC ..... *H04W 52/146* (2013.01); *H04W 72/1268* (2013.01); *H04W 74/0833* (2013.01); *H04W 76/27* (2018.02)

(56) References Cited

U.S. PATENT DOCUMENTS

| | | | | |
|---|---|---|---|---|
| 2013/0324182 | A1* | 12/2013 | Deng | H04W 52/242 455/522 |
| 2014/0348078 | A1* | 11/2014 | Kim | H04L 5/0023 370/329 |
| 2015/0055454 | A1 | 2/2015 | Yang et al. | |
| 2015/0078318 | A1 | 3/2015 | Dinan | |
| 2015/0312922 | A1* | 10/2015 | Uchino | H04L 5/1423 370/329 |
| 2016/0192376 | A1* | 6/2016 | Lee | H04W 48/20 370/252 |
| 2016/0309508 | A1 | 10/2016 | Li et al. | |
| 2017/0303212 | A1 | 10/2017 | Takeda et al. | |
| 2019/0313462 | A1* | 10/2019 | Lin | H04W 74/0833 |
| 2019/0327686 | A1 | 10/2019 | Zhang et al. | |
| 2019/0342839 | A1* | 11/2019 | Shao | H04L 1/1861 |
| 2019/0357178 | A1 | 11/2019 | Bae et al. | |
| 2019/0364559 | A1* | 11/2019 | Han | H04W 52/281 |
| 2020/0036473 | A1* | 1/2020 | Nemeth | H04L 1/203 |
| 2020/0178263 | A1* | 6/2020 | Shao | H04W 72/04 |

FOREIGN PATENT DOCUMENTS

| | | |
|---|---|---|
| CN | 108347760 A | 7/2018 |
| EP | 2 343 946 A2 | 7/2011 |
| JP | 2014116865 A | 6/2014 |
| JP | 2016028475 A | 2/2016 |
| JP | 2016066944 A | 4/2016 |
| JP | 2018038096 A | 3/2018 |
| RU | 2613169 C1 | 3/2017 |
| WO | 2015139032 A1 | 9/2015 |
| WO | 2018/126874 A1 | 7/2018 |
| WO | 2018/143741 A1 | 8/2018 |

OTHER PUBLICATIONS

Russian Office Action dated Sep. 27, 2021 as received in application No. 2021107095/07.
"Discussion on simultaneous reception/transmission of multiple signals/channels" 3GPP TSG RAN WG1 Meeting #93, R1-1806842. Busan, Korea, May 21-25, 2018. OPPO.
"URLLC UCI prioritization" 3GPP TSG RAN WG1 Meeting #93, R1-1806963. Busan, Korea, May 21-25, 2018. InterDigital, Inc.
SG Office Action dated Oct. 28, 2022 as received in Application No. 11202102699S.
Written Opinion of the International Searching Authority dated Apr. 1, 2021 as received in Application No. PCT/CN2019/103015.
CN Office Action dated Mar. 12, 2021 as received in Application No. 201811095578.4.
Japanese Office action dated Apr. 26, 2022 as received in application No. 2021-515642.

* cited by examiner

When it is determined that N uplink channels to be sent cannot be sent simultaneously, send at least some of the N uplink channels based on a priority corresponding to each of the N uplink channels — 201

TRANSMISSION METHOD AND RELATED DEVICES

CROSS-REFERENCE TO RELATED APPLICATIONS

This application is a continuation of PCT Application No. PCT/CN2019/103015 filed on Aug. 28, 2019, which claims priority to Chinese Patent Application No. 201811095578.4 filed in China on Sep. 19, 2018, both of which are incorporated herein by reference in their entireties.

TECHNICAL FIELD

The present disclosure relates to the field of communications technologies, and in particular, to a transmission method and related devices.

BACKGROUND

When user equipment (UE) simultaneously sends two or more independent uplink channels, whether the foregoing two or more uplink channels can be sent simultaneously is determined based on whether uplink power of the UE is restricted and whether the UE has the capability of simultaneously sending uplink channels. If the UE cannot simultaneously send the foregoing two or more uplink channels, the uplink channels are sent based on a sending priority order of uplink channels of a physical layer (that is, a PHY layer) specified in the protocol, which causes poorer flexibility in uplink channel sending control.

SUMMARY

According to a first aspect, an embodiment of the present disclosure provides a transmission method. The method includes:
  when it is determined that N uplink channels to be sent cannot be sent simultaneously, sending at least some of the N uplink channels based on a priority corresponding to each of the N uplink channels, where
  N is an integer greater than 1, the priority corresponding to the uplink channel is determined based on a priority determining parameter corresponding to the uplink channel, and the priority determining parameter includes at least service information corresponding to the uplink channel.

According to a second aspect, an embodiment of the present disclosure further provides a transmission method. The method includes:
  sending a first correspondence to a terminal device, where the first correspondence is a correspondence between service information corresponding to an uplink channel and a priority corresponding to the uplink channel.

According to a third aspect, an embodiment of the present disclosure further provides a terminal device. The terminal device includes:
  a sending module, configured to: when it is determined that N uplink channels to be sent cannot be sent simultaneously, send at least some of the N uplink channels based on a priority corresponding to each of the N uplink channels, where
  N is an integer greater than 1, the priority corresponding to the uplink channel is determined based on a priority determining parameter corresponding to the uplink channel, and the priority determining parameter includes at least service information corresponding to the uplink channel.

According to a fourth aspect, an embodiment of the present disclosure further provides a network side device. The network side device includes:
  a sending module, configured to send a first correspondence to a terminal device, where the first correspondence is a correspondence between service information corresponding to an uplink channel and a priority corresponding to the uplink channel.

According to a fifth aspect, an embodiment of the present disclosure further provides a terminal device, including a processor, a memory, and a computer program stored in the memory and capable of running on the processor, where when the computer program is executed by the processor, the step of the foregoing transmission method provided in the first aspect is implemented.

According to a sixth aspect, an embodiment of the present disclosure further provides a network side device, including a processor, a memory, and a computer program stored in the memory and capable of running on the processor, where when the computer program is executed by the processor, the step of the foregoing transmission method provided in the second aspect is implemented.

According to a seventh aspect, an embodiment of the present disclosure further provides a computer readable storage medium, where the computer readable storage medium stores a computer program, and when the computer program is executed by the processor, the step of the foregoing transmission method provided in the first aspect is implemented or the step of the foregoing transmission method provided in the second aspect is implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding, the following describes some terms used in the embodiments of the present disclosure.

Uplink Transmission Collision:

When user equipment (UE) (also referred to as a terminal device) simultaneously sends two or more independent uplink channels, whether the foregoing two or more uplink channels can be sent simultaneously is determined based on whether uplink power of the UE is restricted and whether the UE has the capability of simultaneously sending uplink channels. If the UE cannot simultaneously send the foregoing two or more uplink channels, the uplink channels are sent based on a sending priority order of uplink channels of a physical layer (that is, a PHY layer) specified in the protocol. The sending priority order of the uplink channels of the physical layer specified in the protocol is as follows:

- physical random access channel (PRACH) transmission on a primary cell (PCell);
- physical uplink control channel (PUCCH) transmission having hybrid automatic repeat request (HARQ) feedback, or physical uplink shared channel (PUSCH) transmission having a scheduling request (SR) or having HARQ feedback;
- PUCCH transmission having channel state information (CSI), or PUSCH transmission having CSI;
- PUSCH transmission having no HARQ feedback, or PUSCH transmission having no CSI; and
- sounding reference signal (SRS) transmission (where a priority of an aperiodic SRS is higher than that of a semi-persistent or periodic SRS), or PRACH transmission of a non-PCell serving cell.

Figures 1, 2:
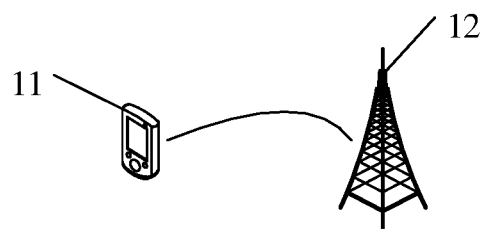
FIG. 1 is a structural diagram of a network system to which an embodiment of the present disclosure may be applied.
FIG. 2 is a flowchart of a transmission method according to an embodiment of the present disclosure.

An embodiment of the present disclosure provides a transmission method. Referring to FIG. 1, FIG. 1 is a structural diagram of a network system to which an embodiment of the present disclosure may be applied. As shown in FIG. 1, the network system includes a terminal device 11 and a network side device 12. The terminal device 11 may be a device on a terminal device side such as a mobile phone, a tablet computer, a laptop computer, a personal digital assistant (PDA), a mobile Internet device (MID), or a wearable device. It should be noted that a specific type of the terminal device 11 is not limited in this embodiment of the present disclosure. The network side device 12 may be a base station, for example, a macro base station, an LTE eNB, a 5G NR NB, or a gNB. The network side device 12 may alternatively be a small cell, for example, a low power node (LPN) pico or a femto, or the network side device 12 may be an access point (AP). The base station may alternatively be a network node including a central unit (CU) and a plurality of transmission reception points (TRP) managed and controlled by the central unit. It should be noted that a specific type of the network side device 12 is not limited in this embodiment of the present disclosure.

In this embodiment of the present disclosure, the terminal device 11 may trigger sending of N uplink channels, and determine whether the foregoing N uplink channels can be sent simultaneously. N is an integer greater than 1. The foregoing N uplink channels may include one or at least two of a PUCCH, a PUSCH, an SRS and a PRACH. A quantity of each type of uplink channel may be one or at least two.

For example, the foregoing N uplink channels may include two PUCCHs, one PUSCH, and two PRACHs.

In an implementation, when it is determined that the foregoing N uplink channels cannot be sent simultaneously, the terminal device 11 may directly determine some uplink channels from the N uplink channels and abandon sending some uplink channels that are determined. For example, some uplink channels that need to be abandoned for sending may be randomly selected from the foregoing N uplink channels. It may be understood that this implementation can also determine, based on channel selection parameters except a priority, some uplink channels that need to be sent, or determine some uplink channels that need to be abandoned for sending.

In another implementation, the terminal device 11 may respectively determine, based on a priority determining parameter corresponding to each of the N uplink channels, a priority corresponding to each uplink channel, and send at least some of the N uplink channels based on the priority corresponding to each uplink channel. For example, uplink channels whose priorities are in the top M are sent, where M is a quantity of uplink channels that can be simultaneously sent by the terminal device 11.

The priority determining parameter corresponding to the foregoing uplink channel may include at least service information corresponding to the uplink channel. The service information corresponding to the uplink channel may include at least one of service type information corresponding to data included in the uplink channel and service type information corresponding to triggering of uplink channel sending.

Optionally, the priority determining parameter corresponding to the uplink channel may also include first information used to indicate information about uplink channels that cannot be sent simultaneously. The first information may include at least one of the following: identification information of a channel, second information used to indicate a reason why the N uplink channels cannot be sent simultaneously, a channel sending priority determined by a physical layer, a quantity of uplink channels that can be sent simultaneously, and the like.

Optionally, the network side device 12 may send a first correspondence to the terminal device 11, where the first correspondence is a correspondence between the service information corresponding to the uplink channel and the priority corresponding to the uplink channel. Therefore, the terminal device 11 may determine the priority corresponding to each uplink channel based on the first correspondence and the service information corresponding to each uplink channel.

It should be noted that when the N uplink channels can be sent simultaneously, the terminal device 11 may simultaneously send the foregoing N uplink channels.

Correspondingly, the network side device 12 may receive the uplink channels sent by the terminal device 11.

According to this embodiment of the present disclosure, when the N uplink channels cannot be sent simultaneously, the priority of each uplink channel may be respectively determined based on the service information corresponding to each uplink channel, and the uplink channel may be sent based on the priority of the uplink channel, so that flexibility of uplink channel sending can be improved.

An embodiment of the present disclosure provides a transmission method, which is applied to a terminal device. Referring to FIG. 2, FIG. 2 is a flowchart of a transmission method according to an embodiment of the present disclosure. As shown in FIG. 2, the method includes the following steps:

Step 201: When it is determined that N uplink channels to be sent cannot be sent simultaneously, send at least some of the N uplink channels based on a priority corresponding to each of the N uplink channels.

N is an integer greater than 1, the priority corresponding to the uplink channel is determined based on a priority determining parameter corresponding to the uplink channel, and the priority determining parameter includes at least service information corresponding to the uplink channel.

In this embodiment of the present disclosure, a terminal device (for example, media access control (MAC) of the terminal device) layer or a physical layer (that is, a PHY layer) may determine, after triggering sending of the N uplink channels, whether the foregoing N uplink channels can be sent simultaneously. For example, the terminal device may determine, based on a sending power of each of the N uplink channels and whether physical resources of each uplink channel are occupied, whether the foregoing N uplink channels can be sent simultaneously.

It should be noted that simultaneous sending of the foregoing N uplink channels may mean that sending of the foregoing N uplink channels overlaps in time. For example, a sending time of an uplink channel 1 is [t1, t2], and a sending time of an uplink channel 2 is [t3, t4], where t2 is greater than t3 and less than or equal to t4, that is, [t1, t2] and [t3, t4] overlap.

In this step, when it is determined that the N uplink channels to be sent cannot be sent simultaneously, the priority corresponding to each uplink channel may be determined based on the priority determining parameter corresponding to each of the foregoing N uplink channels, and at least some of the foregoing N uplink channels may be sent based on the priority corresponding to each uplink channel. The priority determining parameter corresponding to the foregoing uplink channel may include at least service information corresponding to the uplink channel.

For example, priorities corresponding to uplink channels are respectively determined based on service information corresponding to each of the foregoing N uplink channels, (for example, if a PUSCH includes data whose logical channel priority is 1, it is determined that a priority of the PUSCH is 1; and if an SR triggering condition of a PUCCH is triggering of data whose logical channel priority is 2, it is determined that a priority of the PUCCH is 2), and uplink channels whose priorities are in the top M are sent, where M is a quantity of uplink channels that can be simultaneously sent by the terminal device.

According to the transmission method provided in this embodiment of the present disclosure, when it is determined that the N uplink channels to be sent cannot be sent simultaneously, at least some of the N uplink channels are sent based on the priority corresponding to each of the N uplink channels, where N is an integer greater than 1, the priority corresponding to the uplink channel is determined based on the priority determining parameter corresponding to the uplink channel, and the priority determining parameter includes at least the service information corresponding to the uplink channel. According to this embodiment of the present disclosure, the priority of each uplink channel is respectively determined based on the service information corresponding to each uplink channel, and the uplink channel is sent based on the priority of each uplink channel. Therefore, compared with uplink channel sending performed based on a priority of each uplink channel specified in a protocol in the related technologies, flexibility of uplink channel sending is improved. In addition, because the priority of each uplink channel is determined in consideration of the service information corresponding to each uplink channel, the sending of the uplink channels may better meet service requirements.

Optionally, the service information corresponding to the uplink channel includes at least one of the following:
service type information corresponding to data included in the uplink channel; and
service type information corresponding to triggering of uplink channel sending.

In this embodiment of the present disclosure, the service information corresponding to the uplink channel may include the service type information corresponding to the data included in the uplink channel. For example, when the uplink channel is a PUSCH or a PUCCH, the service information corresponding to the uplink channel may be service type information corresponding to data included in the PUSCH or the PUCCH. The service information corresponding to the uplink channel may also include the service type information corresponding to the triggering of the uplink channel sending. For example, when the uplink channel is a PRACH or an SRS channel, the service information corresponding to the uplink channel may be service type information corresponding to triggering of PRACH or SRS sending.

Optionally, when the uplink channel includes a physical uplink shared channel PUSCH, service type information corresponding to data included in the PUSCH includes at least one of the following: information corresponding to a logical channel of the data included in the PUSCH, a type of a Media Access Control control element MAC CE, and a priority of the Media Access Control control element MAC CE;

and/or
when the uplink channel includes a physical uplink control channel PUCCH, service type information corresponding to data included in the PUCCH includes at least one of the following: a data type, and service information corresponding to the data type;

and/or
when the uplink channel includes a physical random access channel PRACH, service type information corresponding to triggering of PRACH sending includes at least one of the following: a type of a trigger event that triggers the PRACH sending, and information corresponding to a logical channel that triggers the PRACH sending;

and/or
when the uplink channel includes a sounding reference signal SRS channel, service type information corresponding to triggering of SRS sending includes: a type of a trigger event that triggers the SRS sending.

In this embodiment of the present disclosure, when the uplink channel includes the PUSCH, the service information corresponding to the uplink channel may include the service type information corresponding to the data included in the PUSCH, where the service type information corresponding to the data included in the PUSCH may include but is not limited to at least one of the following: the information corresponding to the logical channel of the data included in the PUSCH, the type of the MAC control element (CE), and the priority of the MAC CE. The foregoing information corresponding to the logical channel of the data included in the PUSCH may include but is not limited to at least one of the following: an identifier of the logical channel, a priority of the logical channel, a cell corresponding to the logical channel, a cell group corresponding to the logical channel, a data type corresponding to the logical channel, a control signaling type corresponding to the logical channel, and the like. The foregoing type of the MAC CE may include but is not limited to a buffer status report (BSR), a power headroom report (PHR), or the like. The foregoing priority of the MAC CE, for example, a priority of a MAC CE of a cell radio network temporary identifier (C-RNTI), is the highest.

When the uplink channel includes the PUCCH, the service information corresponding to the uplink channel may include the service type information corresponding to the data included in the PUCCH, where the service type information corresponding to the data included in the PUCCH may include but is not limited to at least one of the following: the data type, and the service information corresponding to the data type. The foregoing data type may include but is not limited to an SR, HARQ feedback, a CSI report, or the like. The foregoing service information corresponding to the data type may mean service information corresponding to a data type included in the PUCCH. For example, when the PUCCH includes the SR, the foregoing service information corresponding to the data type includes service information corresponding to the SR (for example, information corresponding to a logical channel that triggers SR sending).

Optionally, when the data type includes a scheduling request SR, the service information corresponding to the data type may include information corresponding to a logical channel that triggers SR sending;
and/or
when the data type includes hybrid automatic repeat request HARQ feedback, the service information corresponding to the data type may include information corresponding to a logical channel that triggers HARQ sending;
and/or
when the data type includes a channel state information CSI report, the service information corresponding to the data type may include a trigger type that triggers the CSI report.

In this embodiment of the present disclosure, the foregoing information corresponding to the logical channel that triggers the SR sending or the foregoing information corresponding to the logical channel that triggers the HARQ sending may include but is not limited to at least one of the following: an identifier of the logical channel, a priority of the logical channel, a cell corresponding to the logical channel, a cell group corresponding to the logical channel, a data type corresponding to the logical channel, a control signaling type corresponding to the logical channel, and the like. The foregoing trigger type that triggers the CSI report may include a periodic report, an aperiodic report, a semi-persistent report, or the like.

When the uplink channel includes the PRACH, the service information corresponding to the uplink channel includes service type information corresponding to triggering of PRACH sending, where the service type information corresponding to triggering of PRACH sending may include but is not limited to at least one of the following: a type of a trigger event that triggers the PRACH sending, and information corresponding to a logical channel that triggers the PRACH sending.

Optionally, the type of the trigger event that triggers the PRACH sending may include at least one of the following:
initial access of radio resource control RRC in an idle state or an inactive state;
state transition of radio resource control RRC in an inactive state;
connection re-establishment of radio resource control RRC;
switch;
addition or change of primary and secondary cells;
downlink data arrival or uplink data arrival of radio resource control RRC in a connected state, where an uplink synchronization state is out-of-synchronization;
establishment of uplink timing of a secondary cell;
system information request; and
beam failure recovery.

In this embodiment of the present disclosure, the foregoing state transition of radio resource control (RRC) in the inactive state is, for example, transition the RRC from the inactive state to a connected state.

When the uplink channel includes an SRS channel, the service information corresponding to the uplink channel includes service type information corresponding to triggering of SRS sending, where the service type information corresponding to the triggering of the SRS sending may include a type of a trigger event that triggers the SRS sending. The type of the trigger event that triggers the SRS sending may include at least one of the following: periodic sending, aperiodic sending, semi-persistent sending, and the like.

Optionally, the information corresponding to the logical channel includes at least one of the following:
an identifier of the logical channel;
a priority of the logical channel;
a cell corresponding to the logical channel;
a cell group corresponding to the logical channel;
a data type corresponding to the logical channel; and
a control signaling type corresponding to the logical channel.

In this embodiment of the present disclosure, the foregoing information corresponding to the logical channel may be the information corresponding to the logical channel of the data included in the PUSCH, the information corresponding to the logical channel that triggers the PRACH sending, the information corresponding to the logical channel that triggers the SR sending, or the information corresponding to the logical channel that triggers the HARQ sending. The foregoing identifier of the logical channel may be, for example, a logical channel 1 and a logical channel 2. The foregoing priority of the logical channel may be, for example, a priority 1 of the logical channel. The foregoing cell group corresponding to the logical channel may be, for example, a master cell group (MCG) or a secondary cell group (SCG). The foregoing data type corresponding to the logical channel may be, for example, RRC signaling or ordinary data (for example, data corresponding to a dedicated traffic channel (DTCH)). The foregoing control signaling type corresponding to the logical channel may be, for example, common control channel (CCCH) control signaling or dedicated control channel (DCCH) control signaling.

Optionally, when the uplink channel includes at least two sets of data corresponding to different service type information, the service information corresponding to the uplink channel is determined based on priorities of the at least two sets of data from the service type information corresponding to the at least two sets of data.

In this embodiment of the present disclosure, when an uplink channel includes at least two sets of data corresponding to different service type information, the service information corresponding to the uplink channel may be determined based on priorities of the at least two sets of data. For example, service type information corresponding to data whose priority is the highest or lowest in the two sets of data included in the uplink channel is determined as the service information corresponding to the uplink channel.

For example, if the PUSCH includes data of two data traffic channels having a logical channel priority 1 and a logical channel priority 2, the terminal device may use the logical channel priority 1 as the service information corresponding to the PUSCH. If the PUCCH includes HARQ feedback of the logical channel priority 1 and HARQ feedback of the logical channel priority 2, the terminal device may use the logical channel priority 1 as the service information corresponding to the PUCCH.

It should be noted that in this embodiment of the present disclosure, it may be predefined in a protocol or configured on a network side that the service type information corresponding to the data whose priority is the highest or lowest in the two sets of data included in the uplink channel is determined as the service information corresponding to the uplink channel.

Optionally, the priority corresponding to the uplink channel is determined based on a first correspondence and the service information corresponding to the uplink channel, and the first correspondence is a correspondence between the service information corresponding to the uplink channel and the priority corresponding to the uplink channel.

In this embodiment of the present disclosure, the foregoing first correspondence may be predefined in a protocol, or may be configured on a network side. Specifically, the terminal device may respectively search, based on the service information corresponding to each of the N uplink channels, a priority corresponding to the service information from the first correspondence as the priority corresponding to each uplink channel. For example, based on service information corresponding to an uplink channel 1, a priority corresponding to the service information is searched from the first correspondence as the priority corresponding to the uplink channel 1; and based on service information corresponding to an uplink channel 2, a priority corresponding to the service information is searched from the first correspondence as the priority corresponding to the uplink channel 2.

In this embodiment of the present disclosure, the priority corresponding to the uplink channel is determined based on the first correspondence and the service information corresponding to the uplink channel, so that efficiency of determining the priority corresponding to the uplink channel can be improved, and then efficiency of uplink channel sending can be improved.

Optionally, the first correspondence may be predefined in a protocol.

Optionally, the method further includes:
receiving the first correspondence sent by a network side device.

In this embodiment of the present disclosure, the first correspondence sent by the network side device is received. Compared with the first correspondence predefined in the protocol, flexibility of configuration of the correspondence between the service information corresponding to the uplink channel and the priority corresponding to the uplink channel can be improved.

Optionally, the sending at least some of the N uplink channels based on a priority corresponding to each of the N uplink channels includes:
when the priority corresponding to each of the N uplink channels is the same, randomly selecting M uplink channels from the N uplink channels for sending, where M is a quantity of uplink channels that can be sent simultaneously.

For example, when it is determined that priorities corresponding to a PUSCH #1, a PUSCH #2, and a PUSCH #3 are the same (for example, priorities of logical channels corresponding to data included in the PUSCH #1, the PUSCH #2, and the PUSCH #3 are the same), and a quantity of uplink channels that can be sent simultaneously is 2, the terminal device may randomly select two uplink channels from the PUSCH #1, the PUSCH #2, and the PUSCH #3 for sending.

In this embodiment of the present disclosure, when the priority corresponding to each of the N uplink channels is the same, M uplink channels are randomly selected from the N uplink channels for sending, so that uplink channels can be sent when priorities corresponding the uplink channels are the same, and flexibility of uplink channel sending is improved.

Optionally, the priority determining parameter further includes first information, and the first information is used to indicate information about uplink channels that cannot be sent simultaneously.

In this embodiment of the present disclosure, the first information is used to indicate information about the uplink channels that cannot be sent simultaneously. For example, the first information may include but is not limited to at least one of the following: identification information of a channel, a channel sending priority determined by a physical layer, information used to indicate a reason why the N uplink channels cannot be sent simultaneously, a quantity of uplink channels that can be sent simultaneously, and the like.

In a practical application, the terminal device may determine the priority corresponding to the uplink channel with reference to both the first information and the service information corresponding to the uplink channel. For example, the physical layer indicates that a priority of a PUSCH #1 (for example, a PUSCH of a PCell) is higher than a priority of a PUSCH #2 (for example, a PUSCH of SCell). When the priorities of the PUSCH #1 and the PUSCH #2 determined based on service information corresponding to uplink channels are the same (for example, priorities of logical channels corresponding to data included in the PUSCH #1 and the PUSCH #2 are the same), it is determined that the priority of the PUSCH #1 is higher than that of the PUSCH #2, that is, the PUSCH #1 is sent first.

It should be noted that in this embodiment of the present disclosure, when the uplink channel is sent, the priority corresponding to the uplink channel determined based on the service information corresponding to the uplink channel may be preferentially considered. In other words, when the priority corresponding to each uplink channel determined based on the service information corresponding to each uplink channel is different, the uplink channel may be directly sent based on the priority corresponding to each uplink channel determined based on the service information corresponding to each uplink channel. When the priority corresponding to each uplink channel determined based on the service information corresponding to each uplink channel is the same, the uplink channel may be sent with reference to the foregoing first information.

Optionally, the first information includes at least one of the following:
identification information of a channel;
second information, where the second information is information used to indicate a reason why the N uplink channels cannot be sent simultaneously;

a channel sending priority determined by a physical layer; and a quantity of uplink channels that can be sent simultaneously.

In this embodiment of the present disclosure, the foregoing identification information of the channel may include but is not limited to at least one of the following: a type of the channel, a cell identifier to which the channel belongs, a cell group identifier to which the channel belongs, a cell type identifier to which the channel belongs, an uplink carrier identifier to which the channel belongs, and the like.

The foregoing second information is information used to indicate a reason why the N uplink channels cannot be sent simultaneously, for example, information used to indicate that the sending power exceeds the maximum sending power allowed by the terminal device, information used to indicate that simultaneous sending cannot be implemented due to sending condition restrictions, information used to indicate that physical resources of the uplink channel are occupied, and the like.

The foregoing channel sending priority determined by the physical layer may be a priority determined based on an uplink channel sending priority of the physical layer specified in a protocol. For the uplink channel sending priority of the physical layer specified in the protocol, refer to the foregoing description. Details are not described herein.

Optionally, the identification information of the channel includes at least one of the following:

a type of the channel;

a cell identifier to which the channel belongs;

a cell group identifier to which the channel belongs;

a cell type identifier to which the channel belongs; and an uplink carrier identifier to which the channel belongs; and/or the second information includes at least one of the following:

information used to indicate that the sending power exceeds the maximum sending power allowed by the terminal device;

information used to indicate that simultaneous sending cannot be implemented due to sending condition restrictions; and information used to indicate that physical resources of the uplink channel are occupied.

In this embodiment of the present disclosure, the foregoing type of the channel may include but is not limited to a PUCCH, a PUSCH, an SRS, a PRACH, or the like. The foregoing cell identifier to which the channel belongs is, for example, a serving cell 1. The foregoing cell group identifier to which the channel belongs is, for example, an MCG or an SCG. The foregoing cell type identifier to which the channel belongs is, for example, a primary cell (PCell), a secondary cell (SCell), a primary secondary cell (PSCell), a special cell (SpCell), or a PUCCH SCell. The foregoing uplink carrier identifier to which the channel belongs is, for example, supplementary uplink (SUL) or normal uplink (NUL).

The sending power exceeds the maximum sending power allowed by the terminal device. For example, the terminal device may indicate a sending power of each uplink channel, and a sum of uplink sending powers when N uplink channels are sent simultaneously exceeds the maximum sending power allowed by the terminal device. Simultaneous sending cannot be implemented due to sending condition restrictions. For example, because a PRACH and a PUCCH cannot be coded simultaneously, the PRACH and the PUCCH cannot be sent simultaneously in one cell. Physical resources of the uplink channel are occupied. For example, the physical resources are occupied by another terminal device, or the physical resources are occupied in advance by another channel of the terminal device (that is, a channel other than the foregoing N channels).

Optionally, before the sending at least some of the N uplink channels based on a priority corresponding to each of the N uplink channels, the method further includes:

indicating, by a physical layer of the terminal device, the first information to a media access control MAC layer.

In this embodiment of the present disclosure, the priority corresponding to each of the N uplink channels may be determined by the MAC layer. Specifically, when it is determined that the N uplink channels cannot be sent simultaneously, the physical layer may indicate the foregoing first information to the MAC layer. Therefore, the MAC layer may determine the priority corresponding to each uplink channel based on the first information and the service information corresponding to each uplink channel.

Optionally, before the sending at least some of the N uplink channels based on a priority corresponding to each of the N uplink channels, the method further includes:

determining, by the MAC layer based on the first information and the service information corresponding to each of the N uplink channels, the priority corresponding to each of the N uplink channels.

In this embodiment of the present disclosure, the MAC layer can directly learn the service information corresponding to each uplink channel. Therefore, the MAC layer determines, based on the first information and the service information corresponding to each of the N uplink channels, the priority corresponding to each of the N uplink channels, so that transmission of data between layers of the terminal device can be reduced, and resources can be saved.

Optionally, after the determining, by the MAC layer based on the first information and the service information corresponding to each of the N uplink channels, the priority corresponding to each of the N uplink channels, the uplink channel that needs to be sent may be determined based on the priority corresponding to each of the N uplink channels, and is indicated to the physical layer, and the corresponding uplink channel is sent by the physical layer.

Optionally, before the sending at least some of the N uplink channels based on a priority corresponding to each of the N uplink channels, the method further includes:

indicating, by a media access control MAC layer of the terminal device to a physical layer, the service information corresponding to each of the N uplink channels; and determining, by the physical layer based on the service information corresponding to each of the N uplink channels, the priority corresponding to each of the N uplink channels.

In this embodiment of the present disclosure, the priority corresponding to each of the N uplink channels may be determined by the physical layer. Specifically, when sending of the N uplink channels is triggered, the MAC layer may indicate, to the physical layer, the service information corresponding to each of the N uplink channels. When it is determined that the N uplink channels cannot be sent simultaneously, the physical layer may determine, based on the service information corresponding to each of the N uplink channels, the priority corresponding to each of the N uplink channels.

Further, after the determining, by the physical layer based on the service information corresponding to each of the N uplink channels, the priority corresponding to each of the N uplink channels, the uplink channel that needs to be sent may be determined based on the priority corresponding to each of the N uplink channels, and is sent.

It should be noted that the physical layer may alternatively determine, with reference to the first information and the service information corresponding to each of the N uplink channels, the priority corresponding to each of the N uplink channels. For example, when the priority corresponding to each uplink channel determined based on the service information corresponding to each uplink channel is the same, the uplink channel is sent with reference to the first information.

In this embodiment of the present disclosure, the physical layer determines, based on the service information corresponding to each of the N uplink channels, the priority corresponding to each of the N uplink channels. Therefore, the physical layer may directly determine, based on the priority corresponding to each of the N uplink channels, the uplink channel that needs to be sent, and send the uplink channel. Compared with that the uplink channel that needs to be sent is indicated by the MAC layer, efficiency of uplink channel sending can be improved.

The following describes the transmission method provided in this embodiment of the present disclosure by using specific examples:

Example 1: The uplink channel that may be finally sent is determined by the MAC layer.

Figure 3:
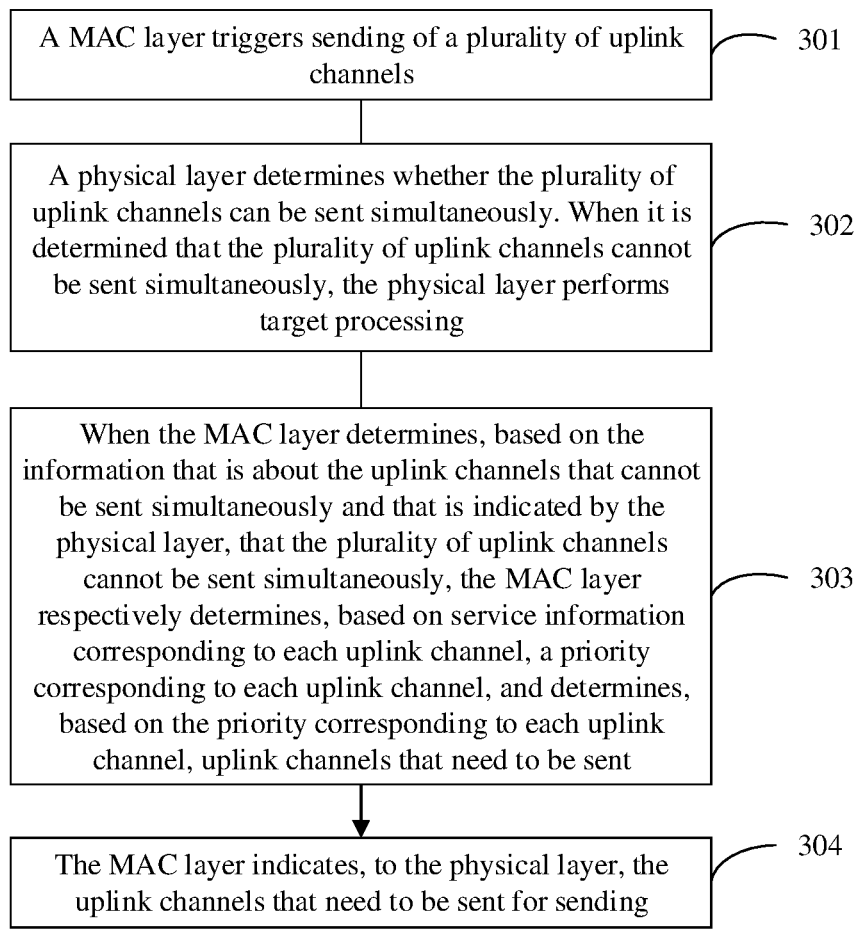
FIG. 3 is a flowchart of another transmission method according to an embodiment of the present disclosure.

As shown in FIG. 3, the transmission method provided in this embodiment of the present disclosure may include the following steps:

Step 301: The MAC layer triggers sending of a plurality of uplink channels.

The foregoing plurality of uplink channels to be sent include any combination of one or more of the following:
- a PUCCH (may be a plurality of PUCCHs);
- a PUSCH (may be a plurality of PUSCHs);
- an SRS (may be a plurality of SRSs); and
- a PRACH (may be a plurality of PRACHs).

Step 302: The physical layer determines whether the plurality of uplink channels can be sent simultaneously. When it is determined that the plurality of uplink channels cannot be sent simultaneously, the physical layer performs target processing.

In this step, the target processing includes at least one of the following:
1. If the physical layer determines to abandon sending some uplink channels, the physical layer directly abandons sending some uplink channels. Further, the physical layer indicates, to the MAC layer, information about uplink channels abandoned for sending (for example, a PUSCH of a secondary cell group (SCG) SCell_1 abandoned for sending).
2. The physical layer indicates, to the MAC layer, information about the uplink channels that cannot be sent simultaneously, that is, the foregoing first information.

It should be noted that for related content of the information about the uplink channels that cannot be sent simultaneously (that is, the foregoing first information), refer to the foregoing related description. To avoid repetition, details are not described herein again.

Step 303: When the MAC layer determines, based on the information that is about the uplink channels that cannot be sent simultaneously and that is indicated by the physical layer, that the plurality of uplink channels cannot be sent simultaneously, the MAC layer respectively determines, based on service information corresponding to each uplink channel, a priority corresponding to each uplink channel, and determines, based on the priority corresponding to each uplink channel, uplink channels that need to be sent.

For example, if a PUSCH includes data whose logical channel priority is 1, it is determined that a priority of the PUSCH is 1; and if an SR triggering condition of a PUCCH is triggering of data whose logical channel priority is 2, it is determined that a priority of the PUCCH is 2.

It should be noted that when the priority corresponding to each uplink channel determined based on the service information corresponding to each uplink channel is the same, the uplink channels may be sent with reference to the foregoing information about the uplink channels that cannot be sent simultaneously (that is, the first information).

For example, the physical layer indicates that a priority of a PUSCH #1 (for example, a PUSCH of a PCell) is higher than a priority of a PUSCH #2 (for example, a PUSCH of SCell). When the priorities of the PUSCH #1 and the PUSCH #2 determined based on service information corresponding to uplink channels are the same (for example, priorities of logical channels corresponding to data included in the PUSCH #1 and the PUSCH #2 are the same), it is determined that the priority of the PUSCH #1 is higher than that of the PUSCH #2, that is, the PUSCH #1 is sent first.

It should be noted that in this embodiment of the present disclosure, for detailed content of the service information corresponding to the uplink channel, refer to the foregoing related description. To avoid repetition, details are not described herein again.

Step 304: The MAC layer indicates, to the physical layer, the uplink channels that need to be sent for sending.

In this embodiment of the present disclosure, the priority corresponding to each of the N uplink channels may be determined by the MAC layer, so that transmission of data between layers of the terminal device can be reduced, and resources can be saved. In addition, when the terminal device cannot simultaneously send a plurality of uplink channels, channels that can be sent are determined based on service information of the channels, so as to ensure that channels having higher service priorities can be successfully sent.

Example 2: The uplink channel that may be finally sent is determined by the physical layer.

Figure 4:
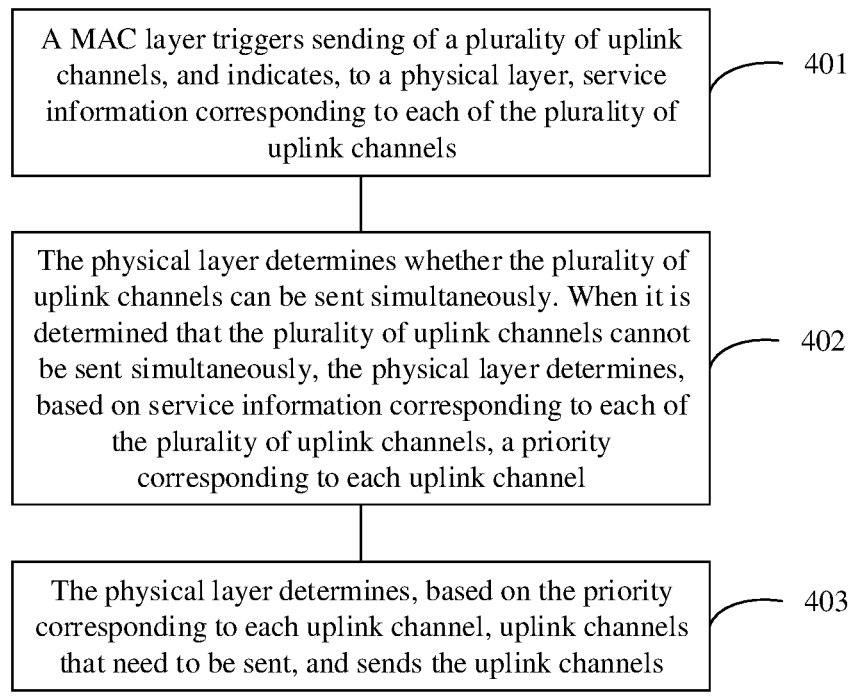
FIG. 4 is a flowchart of still another transmission method according to an embodiment of the present disclosure.

As shown in FIG. 4, the transmission method provided in this embodiment of the present disclosure may include the following steps:

Step 401: The MAC layer triggers sending of a plurality of uplink channels, and indicates, to the physical layer, service information corresponding to each of the plurality of uplink channels.

It should be noted that the MAC layer may immediately indicate, to the physical layer when triggering sending of the plurality of uplink channels, service information corresponding to each of the plurality of uplink channels, or indicate, to the physical layer after the physical layer determines that the plurality of uplink channels cannot be sent simultaneously, service information corresponding to each of the plurality of uplink channels.

Step 402: The physical layer determines whether the plurality of uplink channels can be sent simultaneously. When it is determined that the plurality of uplink channels cannot be sent simultaneously, the physical layer determines, based on service information corresponding to each of the plurality of uplink channels, a priority corresponding to each uplink channel.

It should be noted that in this embodiment of the present disclosure, for detailed content of the service information corresponding to the uplink channel, refer to the foregoing related description. To avoid repetition, details are not described herein again.

It should be noted that the physical layer may alternatively determine, with reference to the first information and the service information corresponding to each of the N uplink channels, the priority corresponding to each of the N uplink channels. For example, when the priority corresponding to each uplink channel determined based on the service information corresponding to each uplink channel is the same, the uplink channel is sent with reference to the first information.

Step 403: The physical layer determines, based on the priority corresponding to each uplink channel, uplink channels that need to be sent, and sends the uplink channels.

Optionally, a sending order of uplink channels may be determined based on priorities of the uplink channels. For example, if an uplink channel priority of a PUSCH that includes a logical channel priority 1 is 1, and an uplink channel priority of a PRACH triggered by data of a logical channel priority 2 is 2, the physical layer determines that sending of the PUSCH is prior to sending of the PRACH.

In this embodiment of the present disclosure, the physical layer determines, based on the service information corresponding to each of the N uplink channels, the priority corresponding to each of the N uplink channels. Therefore, the physical layer may directly determine, based on the priority corresponding to each of the N uplink channels, the uplink channel that needs to be sent, and send the uplink channel. Compared with that the uplink channel that needs to be sent is indicated by the MAC layer, efficiency of uplink channel sending can be improved. In addition, when the terminal device cannot simultaneously send a plurality of uplink channels, channels that can be sent are determined based on service information of the channels, so as to ensure that channels having higher service priorities can be successfully sent.

Figure 5:
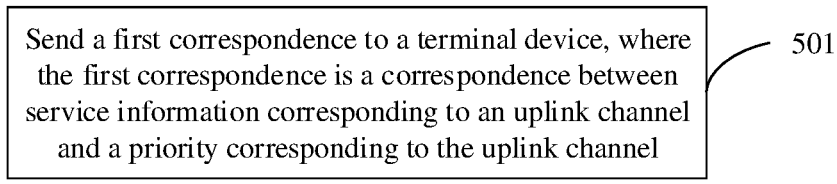
FIG. 5 is a flowchart of yet another transmission method according to an embodiment of the present disclosure.

An embodiment of the present disclosure provides a transmission method, which is applied to a network side device. Referring to FIG. 5, FIG. 5 is a flowchart of another transmission method according to an embodiment of the present disclosure. As shown in FIG. 5, the method includes the following steps:

Step 501: Send a first correspondence to a terminal device, where the first correspondence is a correspondence between service information corresponding to an uplink channel and a priority corresponding to the uplink channel.

In this embodiment of the present disclosure, the network side device may send the first correspondence to the terminal device, so that the terminal device may determine, based on the first correspondence and the service information corresponding to the uplink channel, the priority corresponding to the uplink channel.

It should be noted that after the terminal device sends the uplink channel, the network side device may receive the uplink channel sent by the terminal device.

Optionally, the service information corresponding to the uplink channel may include at least one of the following:
service type information corresponding to data included in the uplink channel; and
service type information corresponding to triggering of uplink channel sending.

Optionally, when the uplink channel includes a physical uplink shared channel PUSCH, service type information corresponding to data included in the PUSCH includes at least one of the following: information corresponding to a logical channel of the data included in the PUSCH, a type of a Media Access Control control element MAC CE, and a priority of the Media Access Control control element MAC CE;

and/or
when the uplink channel includes a physical uplink control channel PUCCH, service type information corresponding to data included in the PUCCH includes at least one of the following: a data type, and service information corresponding to the data type;
and/or
when the uplink channel includes a physical random access channel PRACH, service type information corresponding to triggering of PRACH sending includes at least one of the following: a type of a trigger event that triggers the PRACH sending, and information corresponding to a logical channel that triggers the PRACH sending;
and/or
when the uplink channel includes a sounding reference signal SRS channel, service type information corresponding to triggering of SRS sending includes: a type of a trigger event that triggers the SRS sending.

Optionally, when the data type includes a scheduling request SR, the service information corresponding to the data type includes information corresponding to a logical channel that triggers SR sending;
and/or
when the data type includes hybrid automatic repeat request HARQ feedback, the service information corresponding to the data type includes information corresponding to a logical channel that triggers HARQ sending;
and/or
when the data type includes a channel state information CSI report, the service information corresponding to the data type includes a trigger type that triggers the CSI report.

Optionally, the information corresponding to the logical channel may include at least one of the following:
an identifier of the logical channel;
a priority of the logical channel;
a cell corresponding to the logical channel;
a cell group corresponding to the logical channel;
a data type corresponding to the logical channel; and
a control signaling type corresponding to the logical channel.

Optionally, the type of the trigger event that triggers the PRACH sending may include at least one of the following:
initial access of radio resource control RRC in an idle state or an inactive state;
state transition of radio resource control RRC in an inactive state;
connection re-establishment of radio resource control RRC;
switch;
addition or change of primary and secondary cells;
downlink data arrival or uplink data arrival of radio resource control RRC in a connected state, where an uplink synchronization state is out-of-synchronization;
establishment of uplink timing of a secondary cell;
system information request; and
beam failure recovery.

According to the transmission method in this embodiment of the present disclosure, the network side device sends the first correspondence to the terminal device, where the first correspondence is the correspondence between the service information corresponding to the uplink channel and the priority corresponding to the uplink channel, so that flexibility of configuration of the first correspondence can be improved.

Figure 6:
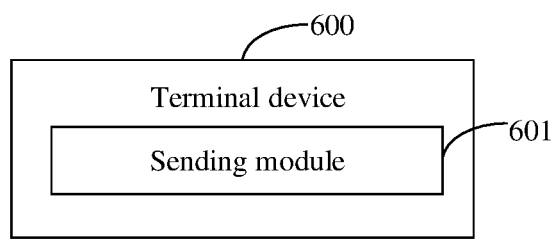
FIG. 6 is a structural diagram of a terminal device according to an embodiment of the present disclosure.

Referring to FIG. 6, FIG. 6 is a structural diagram of a terminal device according to an embodiment of the present disclosure. As shown in FIG. 6, the terminal device 600 includes a sending module 601.

The sending module 601 is configured to: when it is determined that N uplink channels to be sent cannot be sent simultaneously, send at least some of the N uplink channels based on a priority corresponding to each of the N uplink channels.

N is an integer greater than 1, the priority corresponding to the uplink channel is determined based on a priority determining parameter corresponding to the uplink channel, and the priority determining parameter includes at least service information corresponding to the uplink channel.

Optionally, the service information corresponding to the uplink channel includes at least one of the following:
service type information corresponding to data included in the uplink channel; and
service type information corresponding to triggering of uplink channel sending.

Optionally, when the uplink channel includes a physical uplink shared channel PUSCH, service type information corresponding to data included in the PUSCH includes at least one of the following: information corresponding to a logical channel of the data included in the PUSCH, a type of a Media Access Control control element MAC CE, and a priority of the Media Access Control control element MAC CE;
and/or
when the uplink channel includes a physical uplink control channel PUCCH, service type information corresponding to data included in the PUCCH includes at least one of the following: a data type, and service information corresponding to the data type;
and/or
when the uplink channel includes a physical random access channel PRACH, service type information corresponding to triggering of PRACH sending includes at least one of the following: a type of a trigger event that triggers the PRACH sending, and information corresponding to a logical channel that triggers the PRACH sending;
and/or
when the uplink channel includes a sounding reference signal SRS channel, service type information corresponding to triggering of SRS sending includes: a type of a trigger event that triggers the SRS sending.

Optionally, when the data type includes a scheduling request SR, the service information corresponding to the data type includes information corresponding to a logical channel that triggers SR sending;
and/or
when the data type includes hybrid automatic repeat request HARQ feedback, the service information corresponding to the data type includes information corresponding to a logical channel that triggers HARQ sending;
and/or
when the data type includes a channel state information CSI report, the service information corresponding to the data type includes a trigger type that triggers the CSI report.

Optionally, the information corresponding to the logical channel includes at least one of the following:

an identifier of the logical channel;
a priority of the logical channel;
a cell corresponding to the logical channel;
a cell group corresponding to the logical channel;
a data type corresponding to the logical channel; and
a control signaling type corresponding to the logical channel.

Optionally, the type of the trigger event that triggers the PRACH sending includes at least one of the following:
initial access of radio resource control RRC in an idle state or an inactive state;
state transition of radio resource control RRC in an inactive state;
connection re-establishment of radio resource control RRC;
switch;
addition or change of primary and secondary cells;
downlink data arrival or uplink data arrival of radio resource control RRC in a connected state, where an uplink synchronization state is out-of-synchronization;
establishment of uplink timing of a secondary cell;
system information request; and
beam failure recovery.

Optionally, when the uplink channel includes at least two sets of data corresponding to different service type information, the service information corresponding to the uplink channel is determined based on priorities of the at least two sets of data from the service type information corresponding to the at least two sets of data.

Optionally, the priority corresponding to the uplink channel is determined based on a first correspondence and the service information corresponding to the uplink channel, and the first correspondence is a correspondence between the service information corresponding to the uplink channel and the priority corresponding to the uplink channel.

Optionally, the first correspondence is predefined in a protocol.

Optionally, the terminal device further includes:
a receiving module, configured to receive the first correspondence sent by a network side device.

Optionally, the sending at least some of the N uplink channels based on a priority corresponding to each of the N uplink channels includes:
when the priority corresponding to each of the N uplink channels is the same, randomly selecting M uplink channels from the N uplink channels for sending, where M is a quantity of uplink channels that can be sent simultaneously.

Optionally, the priority determining parameter further includes first information, and the first information is used to indicate information about uplink channels that cannot be sent simultaneously.

Optionally, the first information includes at least one of the following:
identification information of a channel;
second information, where the second information is information used to indicate a reason why the N uplink channels cannot be sent simultaneously;
a channel sending priority determined by a physical layer; and
a quantity of uplink channels that can be sent simultaneously.

Optionally, the identification information of the channel includes at least one of the following:
a type of the channel;
a cell identifier to which the channel belongs;
a cell group identifier to which the channel belongs;

a cell type identifier to which the channel belongs; and
an uplink carrier identifier to which the channel belongs; and/or the second information includes at least one of the following:

information used to indicate that the sending power exceeds the maximum sending power allowed by the terminal device;

information used to indicate that simultaneous sending cannot be implemented due to sending condition restrictions; and information used to indicate that physical resources of the uplink channel are occupied.

Optionally, the terminal device further includes:

a first indication module, configured to: before at least some of the N uplink channels are sent based on the priority corresponding to each of the N uplink channels, indicate the first information to a media access control MAC layer by using a physical layer of the terminal device.

Optionally, the terminal device further includes:

a first determining module, configured to: before at least some of the N uplink channels are sent based on the priority corresponding to each of the N uplink channels, determine, by using the MAC layer based on the first information and the service information corresponding to each of the N uplink channels, the priority corresponding to each of the N uplink channels.

Optionally, the terminal device further includes:

a second indication module, configured to: before at least some of the N uplink channels are sent based on the priority corresponding to each of the N uplink channels, indicate, by using the media access control MAC layer of the terminal device to the physical layer, the service information corresponding to each of the N uplink channels; and a second determining module, configured to: determine, by using the physical layer based on the service information corresponding to each of the N uplink channels, the priority corresponding to each of the N uplink channels.

The terminal device 600 provided in this embodiment of the present disclosure can implement processes implemented by the terminal device in the method embodiments of FIG. 2 to FIG. 5. To avoid repetition, details are not described herein again.

According to the terminal device 600 provided in this embodiment of the present disclosure, the sending module 601 is configured to: when it is determined that the N uplink channels to be sent cannot be sent simultaneously, send at least some of the N uplink channels based on the priority corresponding to each of the N uplink channels, where N is an integer greater than 1, the priority corresponding to the uplink channel is determined based on the priority determining parameter corresponding to the uplink channel, and the priority determining parameter includes at least the service information corresponding to the uplink channel. According to this embodiment of the present disclosure, the priority of each uplink channel may be respectively determined based on the service information corresponding to each uplink channel, and the uplink channel may be sent based on the priority of each uplink channel. Compared with uplink channel sending performed based on a priority of each uplink channel specified in a protocol in the related technologies, flexibility of uplink channel sending is improved.

Figure 7:
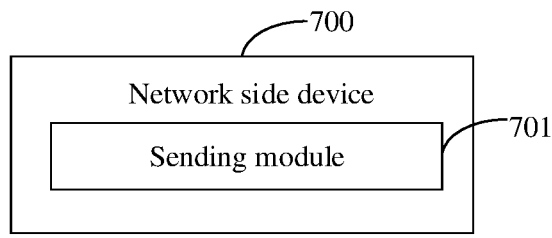
FIG. 7 is a structural diagram of a network side device according to an embodiment of the present disclosure.

Referring to FIG. 7, FIG. 7 is a structural diagram of a network side device according to an embodiment of the present disclosure. As shown in FIG. 7, the network side device 700 includes a sending module 701.

The sending module 701 is configured to send a first correspondence to a terminal device, where the first correspondence is a correspondence between service information corresponding to an uplink channel and a priority corresponding to the uplink channel.

The network side device 700 provided in this embodiment of the present disclosure can implement processes implemented by the network side device in the method embodiments of FIG. 2 to FIG. 5. To avoid repetition, details are not described herein again.

According to the network side device 700 provided in this embodiment of the present disclosure, the sending module 701 is configured to send the first correspondence to the terminal device, where the first correspondence is the correspondence between the service information corresponding to the uplink channel and the priority corresponding to the uplink channel, so that flexibility of configuration of the first correspondence can be improved.

Figure 8:
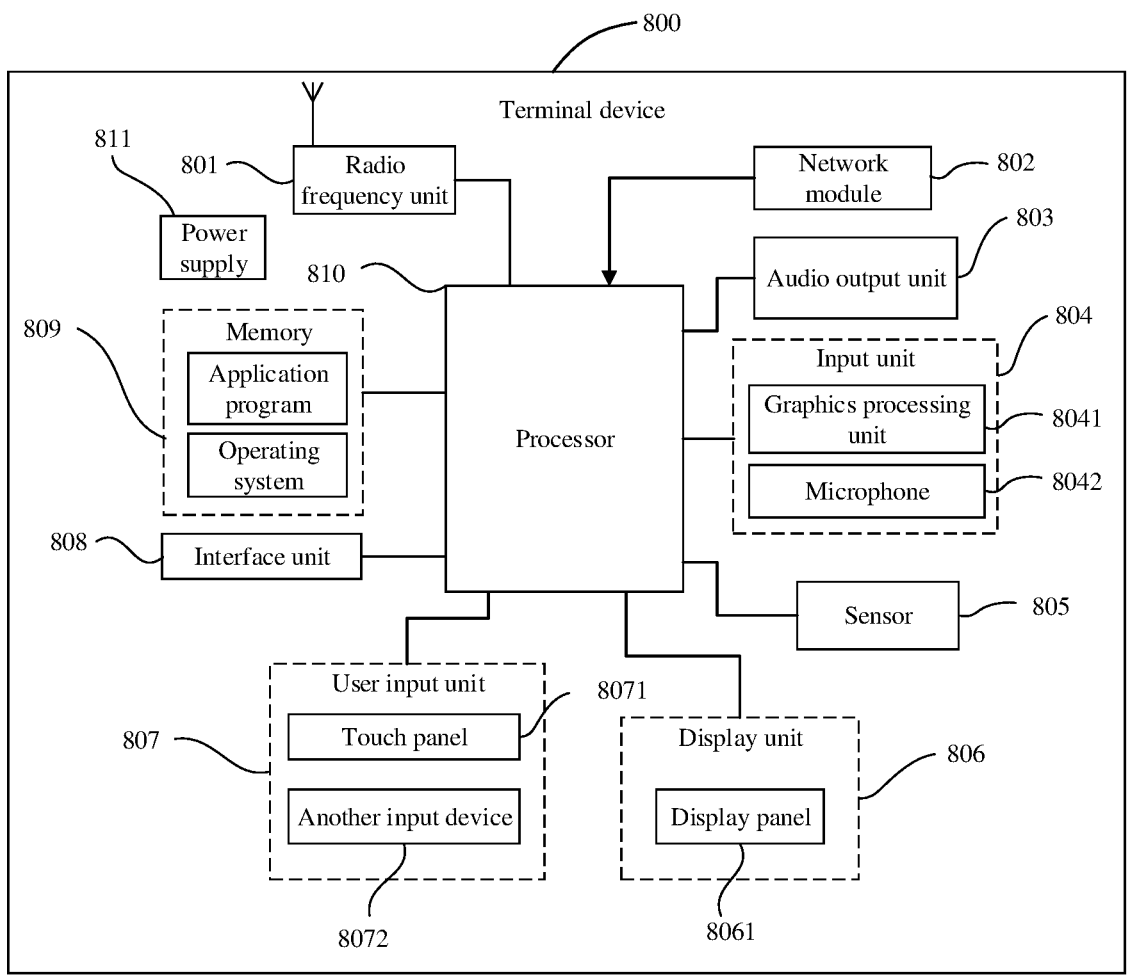
FIG. 8 is a structural diagram of another terminal device according to an embodiment of the present disclosure.

FIG. 8 is a structural diagram of another terminal device according to an embodiment of the present disclosure. As shown in FIG. 8, the terminal device 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and other components. A person skilled in the art may understand that the structure of the terminal device shown in FIG. 8 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The radio frequency unit 801 is configured to: when it is determined that N uplink channels to be sent cannot be sent simultaneously, send at least some of the N uplink channels based on a priority corresponding to each of the N uplink channels, where N is an integer greater than 1, the priority corresponding to the uplink channel is determined based on a priority determining parameter corresponding to the uplink channel, and the priority determining parameter includes at least service information corresponding to the uplink channel.

According to this embodiment of the present disclosure, the priority of each uplink channel may be respectively determined based on the service information corresponding to each uplink channel, and the uplink channel may be sent based on the priority of each uplink channel. Compared with uplink channel sending performed based on a priority of each uplink channel specified in a protocol in the related technologies, flexibility of uplink channel sending is improved.

Optionally, the service information corresponding to the uplink channel includes at least one of the following:

service type information corresponding to data included in the uplink channel; and service type information corresponding to triggering of uplink channel sending.

Optionally, when the uplink channel includes a physical uplink shared channel PUSCH, service type information corresponding to data included in the PUSCH includes at least one of the following: information corresponding to a logical channel of the data included in the PUSCH, a type of a Media Access Control control element MAC CE, and a priority of the Media Access Control control element MAC CE;

and/or when the uplink channel includes a physical uplink control channel PUCCH, service type information corresponding to data included in the PUCCH includes at least one of the following: a data type, and service information corresponding to the data type;

and/or when the uplink channel includes a physical random access channel PRACH, service type information corresponding to triggering of PRACH sending includes at least one of the following: a type of a trigger event that triggers the PRACH sending, and information corresponding to a logical channel that triggers the PRACH sending;

and/or when the uplink channel includes a sounding reference signal SRS channel, service type information corresponding to triggering of SRS sending includes: a type of a trigger event that triggers the SRS sending.

Optionally, when the data type includes a scheduling request SR, the service information corresponding to the data type includes information corresponding to a logical channel that triggers SR sending;

and/or when the data type includes hybrid automatic repeat request HARQ feedback, the service information corresponding to the data type includes information corresponding to a logical channel that triggers HARQ sending;

and/or when the data type includes a channel state information CSI report, the service information corresponding to the data type includes a trigger type that triggers the CSI report.

Optionally, the information corresponding to the logical channel includes at least one of the following:
an identifier of the logical channel;
a priority of the logical channel;
a cell corresponding to the logical channel;
a cell group corresponding to the logical channel;
a data type corresponding to the logical channel; and
a control signaling type corresponding to the logical channel.

Optionally, the type of the trigger event that triggers the PRACH sending includes at least one of the following:
initial access of radio resource control RRC in an idle state or an inactive state;
state transition of radio resource control RRC in an inactive state;
connection re-establishment of radio resource control RRC;
switch;
addition or change of primary and secondary cells;
downlink data arrival or uplink data arrival of radio resource control RRC in a connected state, where an uplink synchronization state is out-of-synchronization;
establishment of uplink timing of a secondary cell;
system information request; and
beam failure recovery.

Optionally, when the uplink channel includes at least two sets of data corresponding to different service type information, the service information corresponding to the uplink channel is determined based on priorities of the at least two sets of data from the service type information corresponding to the at least two sets of data.

Optionally, the priority corresponding to the uplink channel is determined based on a first correspondence and the service information corresponding to the uplink channel, and the first correspondence is a correspondence between the service information corresponding to the uplink channel and the priority corresponding to the uplink channel.

Optionally, the first correspondence is predefined in a protocol.

Optionally, the radio frequency unit 801 is further configured to:
receive the first correspondence sent by a network side device.

Optionally, the processor 810 is configured to:
when the priority corresponding to each of the N uplink channels is the same, randomly select M uplink channels from the N uplink channels for sending, where M is a quantity of uplink channels that can be sent simultaneously.

Optionally, the priority determining parameter further includes first information, and the first information is used to indicate information about uplink channels that cannot be sent simultaneously.

Optionally, the first information includes at least one of the following:
identification information of a channel;
second information, where the second information is information used to indicate a reason why the N uplink channels cannot be sent simultaneously;
a channel sending priority determined by a physical layer; and
a quantity of uplink channels that can be sent simultaneously.

Optionally, the identification information of the channel includes at least one of the following:
a type of the channel;
a cell identifier to which the channel belongs;
a cell group identifier to which the channel belongs;
a cell type identifier to which the channel belongs; and
an uplink carrier identifier to which the channel belongs;

and/or the second information includes at least one of the following:
information used to indicate that the sending power exceeds the maximum sending power allowed by the terminal device;
information used to indicate that simultaneous sending cannot be implemented due to sending condition restrictions; and
information used to indicate that physical resources of the uplink channel are occupied.

Optionally, the processor 810 is further configured to:
before at least some of the N uplink channels are sent based on the priority corresponding to each of the N uplink channels, indicate the first information to a media access control MAC layer by using a physical layer of the terminal device.

Optionally, the processor 810 is further configured to:
before at least some of the N uplink channels are sent based on the priority corresponding to each of the N uplink channels, determine, by using the MAC layer based on the first information and the service information corresponding to each of the N uplink channels, the priority corresponding to each of the N uplink channels.

Optionally, the processor 810 is further configured to:

before at least some of the N uplink channels are sent based on the priority corresponding to each of the N uplink channels, indicate, by using the media access control MAC layer of the terminal device to the physical layer, the service information corresponding to each of the N uplink channels; and determine, by using the physical layer based on the service information corresponding to each of the N uplink channels, the priority corresponding to each of the N uplink channels.

It should be understood that in this embodiment of the present disclosure, the radio frequency unit 801 may be configured to receive and transmit information, or receive and transmit signals during a call. Specifically, the radio frequency unit 801 receives downlink data from a base station, and transmits the downlink data to the processor 810 for processing; and in addition, transmits uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may also communicate with another device through a wireless communications system and network.

The terminal device provides a user with wireless broadband Internet access through the network module 802, for example, helps the user send and receive emails, browse web pages, and access streaming media.

The audio output unit 803 may convert audio data received by the radio frequency unit 801 or the network module 802 or stored in the memory 809 into an audio signal, and output the audio signal into sound. In addition, the audio output unit 803 may also provide audio output related to a specific function performed by the terminal 800 (for example, call signal receiving sound or message receiving sound). The audio output unit 803 includes a speaker, a buzzer, a receiver, and the like.

The input unit 804 is configured to receive an audio signal or a video signal. The input unit 804 may include a graphics processing unit (GPU) 8041 and a microphone 8042. The graphics processing unit 8041 is configured to process image data of a static picture or a video obtained by an image capture apparatus (for example, a camera) in video capture mode or image capture mode. A processed image frame may be displayed on the display unit 806. The image frame processed by the graphics processing unit 8041 may be stored in the memory 809 (or another storage medium) or sent via the radio frequency unit 801 or the network module 802. The microphone 8042 may receive sound and can process such sound into audio data. Processed audio data may be converted, in telephone call mode, into a format that may be sent to a mobile communication base station via the radio frequency unit 801 for output.

The terminal device 800 further includes at least one sensor 805, such as a light sensor, a motion sensor, and other sensors. Specifically, the light sensor includes an ambient light sensor and a proximity sensor, where the ambient light sensor may adjust brightness of the display panel 8061 based on brightness of ambient light, and the proximity sensor may turn off the display panel 8061 and/or backlight when the terminal device 800 moves towards the ear. As a motion sensor, an accelerometer sensor may detect magnitude of acceleration in various directions (usually three axes), may detect magnitude and the direction of gravity when stationary, may be configured to identify postures of the terminal device (such as horizontal and vertical screen switch, related games, and magnetometer posture calibration), may perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein.

The display unit 806 is configured to display information input by the user or information provided to the user. The display unit 806 may include the display panel 8061, and the display panel 8061 may be configured in a form of a liquid crystal display (LCD), an organic light-emitting diode (OLED), or the like.

The user input unit 807 may be configured to receive input numeric or character information, and generate key signal inputs related to user settings and function control of the terminal device. Specifically, the user input unit 807 includes a touch panel 8071 and another input device 8072. The touch panel 8071, also called a touch screen, may collect a touch operation of the user on or near the touch panel 8071 (For example, the user uses any suitable object or accessory such as a finger or a stylus to operate on or near the touch panel 8071). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 810, receives a command sent by the processor 810, and executes the command In addition, the touch panel 8071 may be implemented in various types such as resistive, capacitive, infrared, and surface acoustic wave. In addition to the touch panel 8071, the user input unit 807 may further include the another input device 8072. Specifically, the another input device 8072 may include but is not limited to a physical keyboard, function keys (such as a volume control key and a switch key), a trackball, a mouse, and a joystick. Details are not described herein.

Further, the touch panel 8071 may cover the display panel 8061. When detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. Although in FIG. 8, the touch panel 8071 and the display panel 8061 are configured as two independent components to implement input and output functions of the terminal device, in some embodiments, the touch panel 8071 and the display panel 8061 may be integrated to implement the input and output functions of the terminal device. Details are not limited herein.

The interface unit 808 is an interface for connecting an external apparatus to the terminal device 800. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 808 may be configured to receive an input (for example, data information and power) from the external apparatus and transmit the received input to one or more elements in the terminal device 800, or transmit data between the terminal device 800 and the external apparatus.

The memory 809 may be configured to store software programs and various data. The memory 809 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 809 may include a high-speed random access memory or a nonvolatile memory, for example, at least one disk storage device, a flash memory, or another volatile solid-state storage device.

The processor 810 is a control center of the terminal device, connects various parts of the entire terminal device by using various interfaces and circuits, and performs various functions of the terminal device and processes data by running or executing the software programs and/or the modules stored in the memory 809 and invoking data stored in the memory 809, so as to monitor the terminal device as a whole. The processor 810 may include one or more processing units. Preferably, the processor 810 may integrate an application processor with a modem processor. The application processor mainly processes the operating system, a user interface, the application program, and the like, and the modem processor mainly processes wireless communication. It may be understood that the foregoing modem processor may not be integrated into the processor 810.

The terminal device 800 may further include the power supply 811 (for example, a battery) configured to supply power to various components. Preferably, the power supply 811 may be logically connected to the processor 810 through a power management system, so as to implement functions such as managing charging, discharging, and power consumption through the power management system.

In addition, the terminal device 800 includes some function modules not shown. Details are not described herein.

Preferably, an embodiment of the present disclosure further provides a terminal device, including the processor 810, the memory 809, and a computer program stored in the memory 809 and capable of running on the processor 810, where when the computer program is executed by the processor 810, the processes of the foregoing embodiments of the transmission method are implemented, and the same technical effects can be achieved. To avoid repetition, details are not described herein again.

Figure 9:
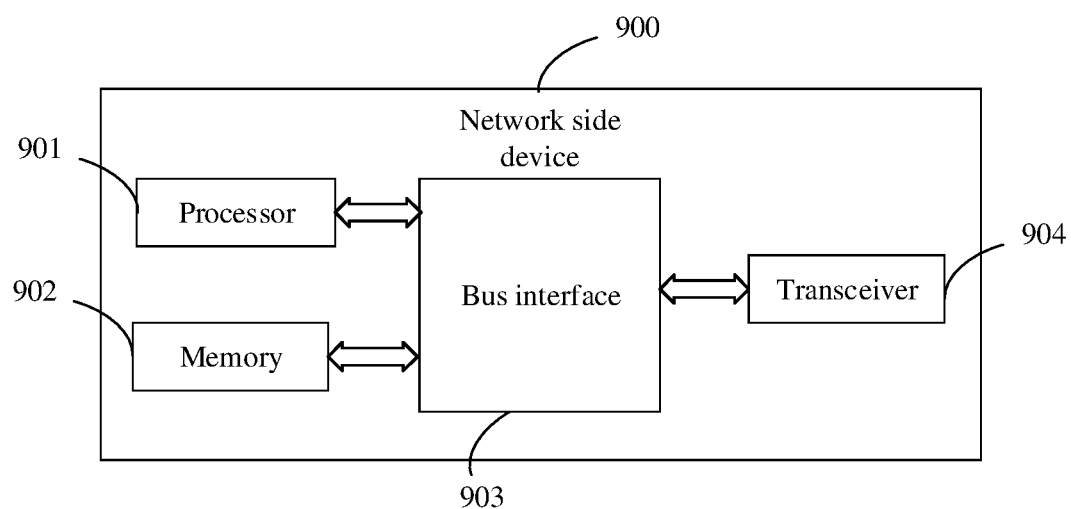
FIG. 9 is a structural diagram of another network side device according to an embodiment of the present disclosure.

Referring to FIG. 9, FIG. 9 is a structural diagram of another network side device according to an embodiment of the present disclosure. As shown in FIG. 9, the network side device 900 includes a processor 901, a memory 902, a bus interface 903, and a transceiver 904, where the processor 901, the memory 902, and the transceiver 904 are all connected to the bus interface 903.

In this embodiment of the present disclosure, the network side device 900 further includes a computer program stored in the memory 902 and capable of running on the processor 901. When the computer program is executed by the processor 901, the following step is implemented:

sending a first correspondence to a terminal device, where the first correspondence is a correspondence between service information corresponding to an uplink channel and a priority corresponding to the uplink channel.

An embodiment of the present disclosure further provides a network side device, including the processor 901, the memory 902, and a computer program stored in the memory 902 and capable of running on the processor 901, where when the computer program is executed by the processor 901, the processes of the foregoing embodiments of the transmission method are implemented, and the same technical effects can be achieved. To avoid repetition, details are not described herein again.

An embodiment of the present disclosure further provides a computer readable storage medium, storing a computer program, where when the computer program is executed by the processor, the processes of the foregoing embodiments of the transmission method are implemented, and the same technical effects can be achieved. To avoid repetition, details are not described herein again. The computer readable storage medium is, for example, a read-only memory (ROM), a random access memory (RAM), a magnetic disk, or an optical disk.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the related technologies may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

What is claimed is:

1. A transmission method, which is applied to a terminal device, comprising:
   when it is determined that N uplink channels to be sent cannot be sent simultaneously, sending at least some of the N uplink channels based on a priority corresponding to each of the N uplink channels, wherein
   N is an integer greater than 1, the priority corresponding to an uplink channel is determined based on a priority determining parameter corresponding to the uplink channel, and the priority determining parameter comprises at least service information corresponding to the uplink channel, wherein the service information corresponding to the uplink channel comprises at least one of the following:

service type information corresponding to data comprised in the uplink channel; and service type information corresponding to triggering of uplink channel sending, wherein when the uplink channel comprises a physical uplink shared channel (PUSCH), service type information corresponding to data comprised in the PUSCH comprises at least one of the following: information corresponding to a logical channel of the data comprised in the PUSCH, a type of a media access control control element (MAC CE), and a priority of the MAC CE;

and/or when the uplink channel comprises a physical uplink control channel (PUCCH), service type information corresponding to data comprised in the PUCCH comprises service information corresponding to a data type;

and/or when the uplink channel comprises a physical random access channel (PRACH), service type information corresponding to triggering of PRACH sending comprises information corresponding to a logical channel that triggers the PRACH sending;

and/or when the uplink channel comprises a sounding reference signal (SRS) channel, service type information corresponding to triggering of SRS sending comprises: a type of a trigger event that triggers the SRS sending, wherein when the data type comprises a scheduling request (SR), the service information corresponding to the data type comprises information corresponding to a logical channel that triggers SR sending;

and/or when the data type comprises hybrid automatic repeat request (HARQ) feedback, the service information corresponding to the data type comprises information corresponding to a logical channel that triggers HARQ sending;

and/or when the data type comprises a channel state information (CSI) report, the service information corresponding to the data type comprises a trigger type that triggers the CSI report, wherein the information corresponding to the logical channel comprises a priority of the logical channel.

2. The method according to claim 1, wherein the information corresponding to the logical channel comprises at least one of the following:

an identifier of the logical channel;

a cell corresponding to the logical channel;

a cell group corresponding to the logical channel;

a data type corresponding to the logical channel; and a control signaling type corresponding to the logical channel.

3. Method according to claim 1, wherein the service type information corresponding to triggering of PRACH sending comprises a type of a trigger event that triggers the PRACH sending, and the type of the trigger event that triggers the PRACH sending comprises at least one of the following:

initial access of radio resource control (RRC) in an idle state or an inactive state;

state transition of RRC in an inactive state;

connection re-establishment of RRC;

handover;

addition or change of primary and secondary cells;

downlink data arrival or uplink data arrival of RRC in a connected state, wherein an uplink synchronization state is out-of-synchronization;

establishment of uplink timing of a secondary cell; system information request; and beam failure recovery.

4. The method according to claim 1, wherein when the uplink channel comprises at least two sets of data corresponding to different service type information, the service information corresponding to the uplink channel is determined based on priorities of the at least two sets of data from the service type information corresponding to the at least two sets of data.

5. The method according to claim 1, wherein the priority corresponding to the uplink channel is determined based on a first correspondence and the service information corresponding to the uplink channel, and the first correspondence is a correspondence between the service information corresponding to the uplink channel and the priority corresponding to the uplink channel.

6. The method according to claim 1, wherein the sending at least some of the N uplink channels based on the priority corresponding to each of the N uplink channels comprises: when the priority corresponding to each of the N uplink channels is the same, randomly selecting M uplink channels from the N uplink channels for sending, wherein M is a quantity of uplink channels that can be sent simultaneously.

7. The method according to claim 1, wherein the priority determining parameter further comprises first information, and the first information is used to indicate information about uplink channels that cannot be sent simultaneously.

8. The method according to claim 7, wherein the first information comprises at least one of the following:

identification information of a channel;

second information, wherein the second information is information used to indicate a reason why the N uplink channels cannot be sent simultaneously;

a channel sending priority determined by a physical layer; and a quantity of uplink channels that can be sent simultaneously.

9. The method according to claim 8, wherein the identification information of the channel comprises at least one of the following: a type of the channel;

a cell identifier to which the channel belongs;

a cell group identifier to which the channel belongs;

a cell type identifier to which the channel belongs; and an uplink carrier identifier to which the channel belongs;

and/or the second information comprises at least one of the following:

information used to indicate that sending power exceeds a maximum sending power allowed by the terminal device;

information used to indicate that simultaneous sending cannot be implemented due to sending condition restrictions; and information used to indicate that physical resources of the uplink channel are occupied.

10. The method according to claim 7, wherein before the sending at least some of the N uplink channels based on the priority corresponding to each of the N uplink channels, the method further comprises:

indicating, by a physical layer of the terminal device, the first information to a media access control (MAC) layer.

11. The method according to claim 10, wherein before the sending at least some of the N uplink channels based on the priority corresponding to each of the N uplink channels, the method further comprises:
determining, by the MAC layer based on the first information and the service information corresponding to each of the N uplink channels, the priority corresponding to each of the N uplink channels.

12. The method according to claim 1, wherein before the sending at least some of the N uplink channels based on the priority corresponding to each of the N uplink channels, the method further comprises:
indicating, by a media access control (MAC) layer of the terminal device to a physical layer, the service information corresponding to each of the N uplink channels; and
determining, by the physical layer based on the service information corresponding to each of the N uplink channels, the priority corresponding to each of the N uplink channels.

13. A transmission method, which is applied to a network side device, comprising:
sending a first correspondence to a terminal device, wherein the first correspondence is a correspondence between service information corresponding to an uplink channel and a priority corresponding to the uplink channel,
wherein the service information corresponding to the uplink channel comprises at least one of the following:
service type information corresponding to data comprised in the uplink channel; and
service type information corresponding to triggering of uplink channel sending,
wherein when the uplink channel comprises a physical uplink shared channel (PUSCH), service type information corresponding to data comprised in the PUSCH comprises at least one of the following: information corresponding to a logical channel of the data comprised in the PUSCH, a type of a media access control control element (MAC CE), and a priority of the MAC CE;
and/or
when the uplink channel comprises a physical uplink control channel (PUCCH), service type information corresponding to data comprised in the PUCCH comprises service information corresponding to a data type;
and/or
when the uplink channel comprises a physical random access channel (PRACH), service type information corresponding to triggering of PRACH sending comprises information corresponding to a logical channel that triggers the PRACH sending;
and/or
when the uplink channel comprises a sounding reference signal (SRS) channel, service type information corresponding to triggering of SRS sending comprises: a type of a trigger event that triggers the SRS sending,
wherein when the data type comprises a scheduling request (SR), the service information corresponding to the data type comprises information corresponding to a logical channel that triggers SR sending;
and/or
when the data type comprises hybrid automatic repeat request (HARQ) feedback, the service information corresponding to the data type comprises information corresponding to a logical channel that triggers HARQ sending;
and/or
when the data type comprises a channel state information (CSI) report, the service information corresponding to the data type comprises a trigger type that triggers the CSI report,
wherein the information corresponding to the logical channel comprises a priority of the logical channel.

14. A terminal device, comprising a processor, a memory, and a computer program stored in the memory and capable of running on the processor, wherein when the computer program is executed by the processor, following steps are implemented:
when it is determined that N uplink channels to be sent cannot be sent simultaneously, sending at least some of the N uplink channels based on a priority corresponding to each of the N uplink channels, wherein
N is an integer greater than 1, the priority corresponding to an uplink channel is determined based on a priority determining parameter corresponding to the uplink channel, and the priority determining parameter comprises at least service information corresponding to the uplink channel,
wherein the service information corresponding to the uplink channel comprises at least one of the following:
service type information corresponding to data comprised in the uplink channel; and
service type information corresponding to triggering of uplink channel sending,
wherein when the uplink channel comprises a physical uplink shared channel (PUSCH), service type information corresponding to data comprised in the PUSCH comprises at least one of the following: information corresponding to a logical channel of the data comprised in the PUSCH, a type of a media access control control element (MAC CE), and a priority of the MAC CE;
and/or
when the uplink channel comprises a physical uplink control channel (PUCCH), service type information corresponding to data comprised in the PUCCH comprises service information corresponding to a data type;
and/or
when the uplink channel comprises a physical random access channel (PRACH), service type information corresponding to triggering of PRACH sending comprises information corresponding to a logical channel that triggers the PRACH sending;
and/or
when the uplink channel comprises a sounding reference signal (SRS) channel, service type information corresponding to triggering of SRS sending comprises: a type of a trigger event that triggers the SRS sending,
wherein when the data type comprises a scheduling request (SR), the service information corresponding to the data type comprises information corresponding to a logical channel that triggers SR sending;
and/or
when the data type comprises hybrid automatic repeat request (HARQ) feedback, the service information corresponding to the data type comprises information corresponding to a logical channel that triggers HARQ sending;
and/or
when the data type comprises a channel state information (CSI) report, the service information corresponding to the data type comprises a trigger type that triggers the CSI report, wherein the information corresponding to the logical channel comprises a priority of the logical channel.

15. A network side device, comprising a processor, a memory, and a computer program stored in the memory and capable of running on the processor, wherein when the computer program is executed by the processor, the step of the transmission method according to claim is implemented.

16. The terminal device according to claim 14, wherein the information corresponding to the logical channel comprises at least one of the following:
an identifier of the logical channel;
a cell corresponding to the logical channel;
a cell group corresponding to the logical channel;
a data type corresponding to the logical channel; and
a control signaling type corresponding to the logical channel.

17. The terminal device according to claim 14, wherein the service type information corresponding to triggering of PRACH sending comprises a type of a trigger event that triggers the PRACH sending, and the type of the trigger event that triggers the PRACH sending comprises at least one of the following:
initial access of radio resource control (RRC) in an idle state or an inactive state;
state transition of RRC in an inactive state;
connection re-establishment of RRC;
handover;
addition or change of primary and secondary cells;
downlink data arrival or uplink data arrival of RRC in a connected state, wherein an uplink synchronization state is out-of-synchronization;
establishment of uplink timing of a secondary cell;
system information request; and
beam failure recovery.

18. The terminal device according to claim 14, wherein when the uplink channel comprises at least two sets of data corresponding to different service type information, the service information corresponding to the uplink channel is determined based on priorities of the at least two sets of data from the service type information corresponding to the at least two sets of data.

19. A non-transitory computer readable storage medium, wherein the computer readable storage medium stores a computer program, and when the computer program is executed by the processor, the step of the transmission method according to claim is implemented.

20. A non-transitory computer readable storage medium, wherein the computer readable storage medium stores a computer program, and when the computer program is executed by the processor, the step of the transmission method according to claim is implemented.

* * * * *